United States Patent
Lee

(10) Patent No.: US 10,976,565 B2
(45) Date of Patent: Apr. 13, 2021

(54) SPECKLE REDUCTION DEVICE AND METHOD OF REDUCING SPECKLE

(71) Applicant: BRYTN CO., LTD., Seongnam-si (KR)

(72) Inventor: Hak Soon Lee, Seoul (KR)

(73) Assignee: BRYTN CO., LTD., Seongnam-si (KR)

( * ) Notice: Subject to any disclaimer, the term of this patent is extended or adjusted under 35 U.S.C. 154(b) by 438 days.

(21) Appl. No.: 15/790,936

(22) Filed: Oct. 23, 2017

(65) Prior Publication Data

US 2018/0045976 A1 Feb. 15, 2018

Related U.S. Application Data

(63) Continuation of application No. PCT/KR2016/003774, filed on Apr. 11, 2016.

(30) Foreign Application Priority Data

Apr. 30, 2015 (KR) .......... 10-2015-0061322

(51) Int. Cl.
| | |
|---|---|
| G02B 27/48 | (2006.01) |
| G02B 27/09 | (2006.01) |
| G02B 26/08 | (2006.01) |
| G02B 3/00 | (2006.01) |
| G02B 27/28 | (2006.01) |
| G02B 27/64 | (2006.01) |

(52) U.S. Cl.
CPC .......... *G02B 27/48* (2013.01); *G02B 3/0006* (2013.01); *G02B 26/0875* (2013.01); *G02B 27/0955* (2013.01); *G02B 27/0961* (2013.01); *G02B 27/283* (2013.01); *G02B 27/64* (2013.01); *G02B 27/0944* (2013.01)

(58) Field of Classification Search
None
See application file for complete search history.

(56) References Cited

U.S. PATENT DOCUMENTS

2015/0370069 A1* 12/2015 Saisho .............. G02B 27/0101
  359/205.1
2017/0363946 A1* 12/2017 Tremblay .............. G02B 27/48

FOREIGN PATENT DOCUMENTS

| CN | 203894525 U | 10/2014 |
|---|---|---|
| CN | 104375280 A | 2/2015 |
| JP | 2010-044309 A | 2/2010 |
| JP | 2011-075651 A | 4/2011 |
| JP | 2012-212099 A | 11/2012 |
| KR | 10-2008-0111048 A | 12/2008 |
| WO | 2014/181306 A1 | 11/2014 |

OTHER PUBLICATIONS

International Search Report for PCT/KR2016/003774 dated Jul. 29, 2016.
Chinese Office Action dated Jun. 25, 2019, in connection with counterpart Chinese Patent Application No. 201680024769.4.

* cited by examiner

*Primary Examiner* — Darryl J Collins
*Assistant Examiner* — Journey F Sumlar
(74) *Attorney, Agent, or Firm* — Hauptman Ham, LLP

(57) ABSTRACT

A speckle reduction device includes: a beam-shaping lens to shape at least one laser beam emitted from at least one light source, and to transmit the shaped laser beam to a panel; and a vibration unit to vibrate the beam-shaping lens in directions of two or more vibration axes such that a direction of the laser beam to be transmitted to the panel is changed to forms a plurality of different patterns.

13 Claims, 6 Drawing Sheets

US 10,976,565 B2

SPECKLE REDUCTION DEVICE AND METHOD OF REDUCING SPECKLE

CROSS-REFERENCE TO RELATED APPLICATIONS

The present application is a continuation of International Application No. PCT/KR2016/003774, filed Apr. 11, 2016, which is based upon and claims the benefit of priority from Korean Patent Application No. 10-2015-0061322, filed on Apr. 30, 2015. The disclosures of the above-listed applications are hereby incorporated by reference herein in their entirety.

FIELD

The present disclosure relates to a device and method for reducing speckles occurring in a projection display device that uses a laser as a light source.

BACKGROUND

The statements in this section merely provide background information related to the present disclosure and do not constitute prior art.

A laser is widely used in projection display devices due to the following advantages: the laser has a wide color reproduction range, so that the laser can express an image close to a natural color; the laser allows an optical system to be easily designed; and the laser is excellent in light emission efficiency.

The inventor(s) has noted that due to the high coherence of laser, speckles, which are small twinkling particles, occur when laser beams are projected onto an uneven screen surface, thereby deteriorating image quality.

The inventor(s) has noted that in order to reduce the occurrence of speckles, there has been proposed a method of reducing the occurrence of speckles by arbitrarily changing phases of laser beams from respective R, G, and B laser light sources so as to reduce the coherence of laser beams.

However, in order to arbitrarily change the phases of laser beams, the inventor(s) has noted that it is necessary to additionally provide a separate device, such as a diffuser sheet, on a laser beam line. Thus, costs are increased, the size of the display device is increased, the structure of the display device is complicated, and the optical efficiency of the display device is lowered.

In addition, the inventor(s) has noted that there is a limitation in that speckle occurrence reduction efficiency falls short of expectations.

SUMMARY

In accordance with another aspect of the present disclosure, a speckle reduction device comprises: a beam-shaping lens configured to shape at least one laser beam emitted from at least one light source, and transmit the shaped laser beam to a panel; and a vibration unit configured to vibrate the beam-shaping lens in directions of two or more vibration axes such that a direction of the laser beam to be transmitted to the panel is changed to form a plurality of different patterns.

In accordance with another aspect of the present disclosure, a speckle reduction device performs a method comprising: shaping at least one laser beam emitted from at least one light source; transmitting the shaped laser beam to a panel; vibrating beam-shaping lens in directions of two or more vibration axes to change a direction of the laser beam to be transmitted to the panel to thereby form a plurality of different patterns; capturing an image of a screen on which the image generated by the panel is displayed based on the laser beam transmitted to the panel; analyzing the image obtained by the imaging unit so as to measure a speckle level of the image; and controlling a vibration operation of a vibration unit to reduce the speckle level.

DETAILED DESCRIPTION

The various embodiments of the present disclosure is to provide a device that is capable of reducing speckles using an optical element of a projection optical system without using an additional and separate optical device.

Hereinafter, an embodiment of the present disclosure will be described with reference to the accompanying drawings.

Figure 1:
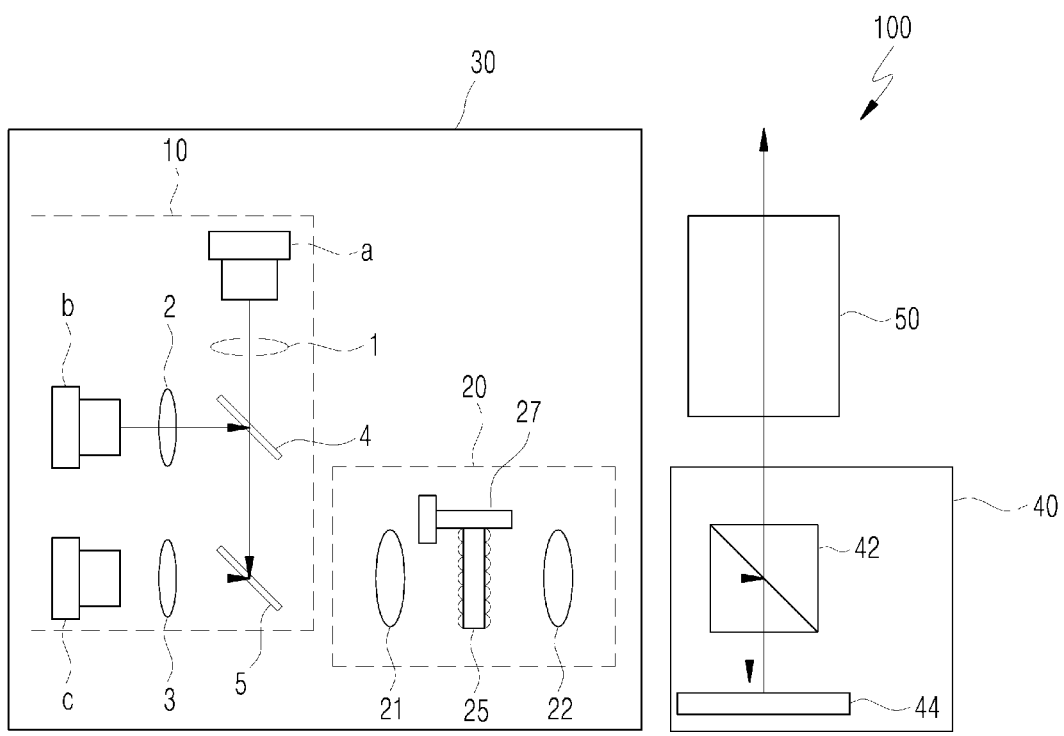
FIG. 1 is a schematic view of configuration of a projection display device in which a speckle reduction device according to at least one embodiment of the present disclosure is implemented.

FIG. 1 is a schematic view of configuration of a projection display device in which a speckle reduction device according to at least one embodiment of the present disclosure is implemented.

The speckle reduction device according to the present disclosure is applied to a display device, such as a projector, particularly to a projection display device that uses a laser as a light source.

The various embodiments of the present disclosure propose a method that is capable of reducing speckles using an optical element of a projection optical system without additionally using a separate optical device.

Hereinafter, the speckle reduction device of the present disclosure will be described with reference to a projection display device that uses a laser as a light source, and more specifically, the structure of an optical system 100 employed in the projection display device, as illustrated in FIG. 1.

FIG. 1 illustrates a general structure of a projection optical system 100 using a single panel 44 for the convenience of explanation.

As illustrated in FIG. 1, the optical system 100 is divided into an illumination optical system 30, a panel unit 40, and a projection optical system 50.

The projection optical system 50 includes a plurality of lenses (not illustrated), and is configured to enlarge and project an image transmitted from the panel unit 40. Thus, an image projected by the projection optical system 50 is expressed on a screen so that a human visually recognizes the image.

The panel unit 40 is configured to generate an image based on a laser beam transmitted from the illumination optical system 30. The panel unit 40 includes a polarization beam splitter 42 configured to change the direction of a laser beam transmitted from the illumination optical system 30 and a panel 44 configured to generate an image.

Although not illustrated in FIG. 1, the panel unit 40 is configured to additionally include a quarter wave plate on the front end of the panel 44.

The panel 44 is a Liquid Crystal on Silicon (LCoS) panel, which is a reflection-type panel.

In addition, the panel 44 is, for example, a Liquid Crystal Display (LCD) panel, which is a transmission-type panel, or a Digital Micromirror Device (DMD), which is a reflection-type panel. If the panel 44 is an LCD panel or a DMD panel, the optical system configuration of the panel unit 40 is different from that of FIG. 1.

As illustrated in FIG. 1, the illumination optical system 30 is constituted with a color synthesis unit 10 and a beam-shaping unit 20.

The color synthesis unit 10 is configured to synthesize three-color light sources of red, green, and blue (hereinafter, referred to as R, G, and B laser light sources), and includes an R laser light source a, a G laser light source b, a B laser light source C, parallel lenses 1, 2, and 3 for respective light sources, and color selection mirrors 4 and 5 for respective color lines.

The beam-shaping unit 20 is configured to shape laser beams emitted from the light sources, i.e. R, G, B laser light sources a, b, and c, to uniformize the laser beams, and to transmit the laser beams to the panel unit 40. The beam-shaping unit 20 includes field lenses 21 and 22 and a beam-shaping lens 25 configured to shape laser beams.

At this time, the beam-shaping lens 25 is a Fly Eye Lens (FEL).

The speckle reduction device of the present disclosure relates to the configuration of the beam-shaping unit 20 in the projection optical system 100 as described above. More specifically, the speckle reduction device of the present disclosure relates to the beam-shaping lens 25 of the beam-shaping unit 20.

Hereinafter, the speckle reduction device of the present disclosure will be described in detail with reference to FIG. 2.

The speckle reduction device of the present disclosure includes a beam-shaping lens 25 configured to shape a laser beam emitted from light sources and to transmit the shaped laser beam to a panel, and a vibration unit 27 configured to vibrate the laser beam-shaping lens 25 in directions of two or more vibration axes such that the laser beams transmitted to the panel form a plurality of different patterns depending on the vibration of the beam-shaping lens 25. The plurality of different patterns are formed by passing through lens of the laser beam-shaping lens 25 which is vibrated by the vibration unit 27. The plurality of different patterns indicate laser beams' patterns which are incurred due to a change of the laser beams' projection direction (or transmission direction) to the panel 44 from lens of the laser beam-shaping lens 25, while the laser beam-shaping lens 25 is being vibrated in directions of the two or more vibration axes.

Here, the panel is the panel 44 of the panel unit 40 illustrated in FIG. 1.

In addition, the light sources is at least one of the R laser light source a, the G laser light source b, and the B laser light source c illustrated in FIG. 1.

The beam-shaping lens 25 is configured to shape laser beams emitted from light sources, i.e. the R, G, B laser light sources a, b, and c, and to transmit the shaped laser beams to the panel unit 44.

The vibrating unit 27 vibrates the beam-shaping lens 25 in the directions of two or more vibration axes such that the laser beams transmitted to the panel 44 form a plurality of different patterns depending on the vibration of the beam-shaping lens 25.

At this time, the two or more vibration axes include, for example, a first vibration axis, which is defined in the plane of the beam-shaping lens 25, and a second vibration axis, which is orthogonal to the first vibration axis described above.

In describing an embodiment, when it is assumed that the plane of the beam-shaping lens 25 is a two-dimensional plane that is defined by an X-axis and a Y-axis, the first vibration axis is a vibration axis defined in a two-dimensional XY-plane.

Figure 2:
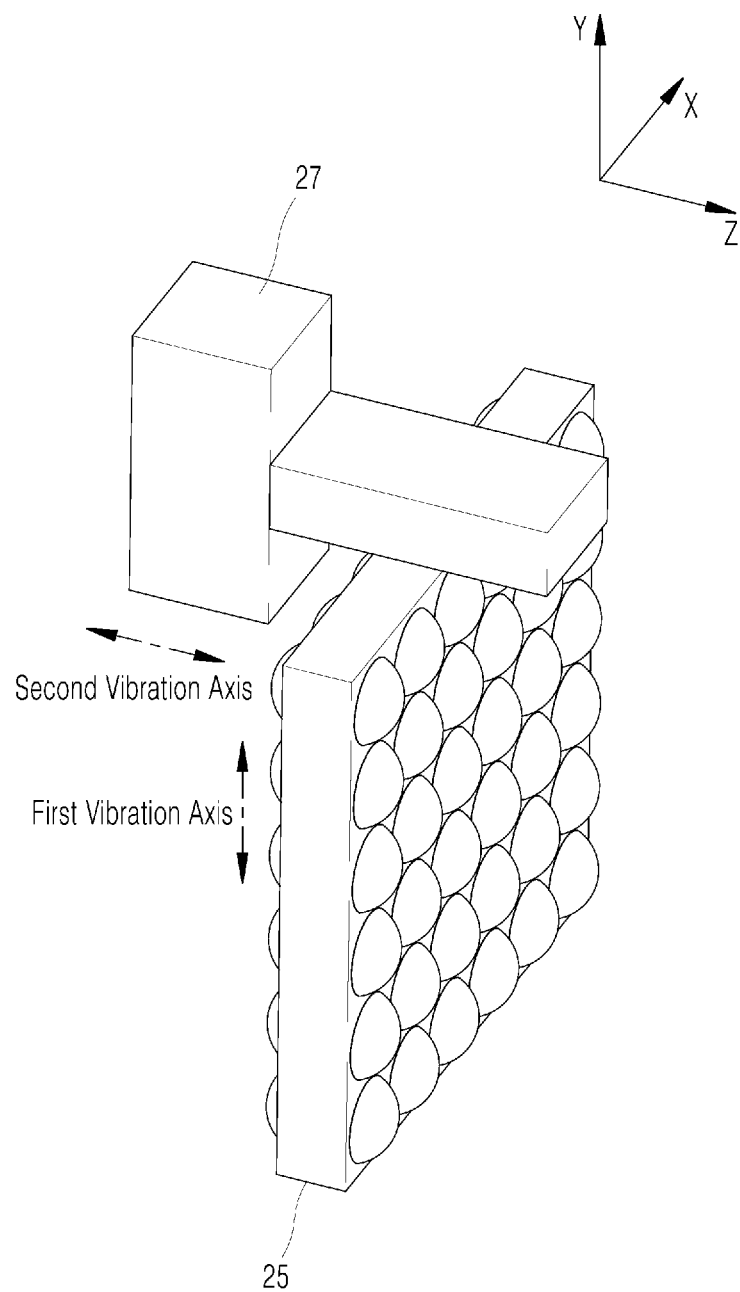
FIG. 2 is a schematic view of a structure of a speckle reduction device according to at least one embodiment of the present disclosure.

At this time, the shape and vibration direction of the first vibration axis is not limited to the example illustrated in FIG. 2 unless the first vibration axis is out of the plane of the beam-shaping lens 25, i.e., the two-dimensional XY-plane.

In addition, when it is assumed that an axis, which is orthogonal to the first vibration axis defined in the two-dimensional XY-plane, is a Z axis, the second vibration axis corresponds to a vibration axis defined on the Z axis.

That is, the second vibration axis is referred to as the Z axis.

For example, as illustrated in FIG. 2, the first vibration axis is a vibration axis that corresponds to the Y-axis on the two-dimensional XY-plane of the beam-shaping lens 25 and the second vibration axis is a vibration axis that corresponds to the Z-axis orthogonal to the first vibration axis.

The vibration unit 27 including one or more vibration or piezo elements (e.g., motors or vibrators) vibrates the beam-shaping lens 25 in the directions of two or more vibration axes, for example, in the directions of the above-described first vibration axis (e.g., the Y-axis) and second vibration axis (e.g., the Z-axis). Vibration controller 80 shown in FIG. 4 controls the one or more vibration (or piezo) elements of the vibration unit 27 to vibrate the beam-shaping lens 25 in the directions of two or more vibration axes.

At this time, the vibration rule for the vibration unit 27 to vibrate the beam-shaping lens 25 in the directions of two or more vibration axes is a preset rule or an arbitrary random rule.

That is, when the vibration unit 27 vibrates in the directions of two or more vibration axes, the vibration unit 27 sequentially vibrates in the directions of respective vibration axes according to a predetermined rule, or randomly vibrates according to an arbitrary random rule.

For example, when the vibration unit 27 vibrates in the directions of the first vibration axis (e.g., the Y-axis) and the second vibration axis (e.g., the Z-axis) as described above, the vibration unit 27 sequentially vibrates the beam-shaping lens 25 in the directions of the first vibration axis (e.g., the Y-axis) and the second vibration axis (e.g., the Z-axis) in such a manner that the beam-shaping lens 25 is vibrated once in the direction of the first vibration axis (e.g., Y-axis), once in the direction of the second vibration axis (e.g., the Z-axis), once in the direction of the first vibration axis (e.g., the Y axis), and once in the second vibration axis (e.g., the Z-axis).

Alternatively, when the vibration unit 27 vibrates in the directions of the first vibration axis (e.g., the Y-axis) and the second vibration axis (e.g., the Z-axis) as described above, the vibration unit 27 randomly vibrates the beam-shaping lens 25 in the respective directions of the first vibration axis (e.g., the Y-axis) and the second vibration axis (e.g., the Z-axis).

The vibration unit 27 is implemented by a single vibration element (e.g., a motor or a vibrator) having two or more vibration axes, or by two or more vibration elements (e.g., two or more motors or vibrators) each having a single vibration axis.

That is, the vibration unit 27 has a structure that is made of a single vibration/piezo element that vibrates in the directions of two or more vibrational axes, or has a structure that is made by coupling two or more vibration/piezo elements each vibrating in the direction of a single vibration axis.

Of course, the vibration unit 27 is implemented as various types of configuration without a limitation thereon (e.g., the connection relationship with the beam-shaping lens 25 and the vibration principle) as long as the vibration unit 27 vibrates the beam-shaping lens 25 simultaneously in the directions of two or more vibration axes, for example, the first vibration axis (e.g., the Y-axis) and the second vibration axis (e.g., the Z-axis).

In this way, when the beam-shaping lens 25 is vibrated in the directions of two or more vibration axes, for example, the first vibration axis (e.g., the Y-axis) and the second vibration axis (e.g., the Z-axis), the laser beams transmitted to the light panel 44 forms a plurality of different patterns, where the plurality of different patterns indicate the different laser beam patterns which are incurred due to phenomenon of at least one of refraction, diffraction and scattering when the laser beams are transmitted through the beam-shaping lens 25.

More specifically, when the beam-shaping lens 25 is vibrated in the direction of the first vibration axis (e.g., the Y-axis), the position where the pattern is formed by the laser beams transmitted to the panel 44 is different from the position where the pattern is formed by the laser beams in the case in which the beam-shaping lens 25 is fixed.

In addition, when the beam-shaping lens 25 is vibrated in the direction of the second vibration axis (e.g., the Y-axis), the size of the pattern that is formed by the laser beams transmitted to the panel 44 is different from the size of the pattern that is formed by the laser beams transmitted to the panel 44 in the case in which the beam-shaping lens 25 is fixed.

Hereinafter, an example in which the laser beams form a plurality of patterns using the speckle reduction device in accordance with an exemplary embodiment of the present disclosure will be described in detail with reference to FIGS. 3A to 3C. Prior to the detailed description, it is noted that the illustration of the vibration unit 27 is omitted from FIGS. 3A to 3C for the sake of simplification of the drawings.

Figure 3A:
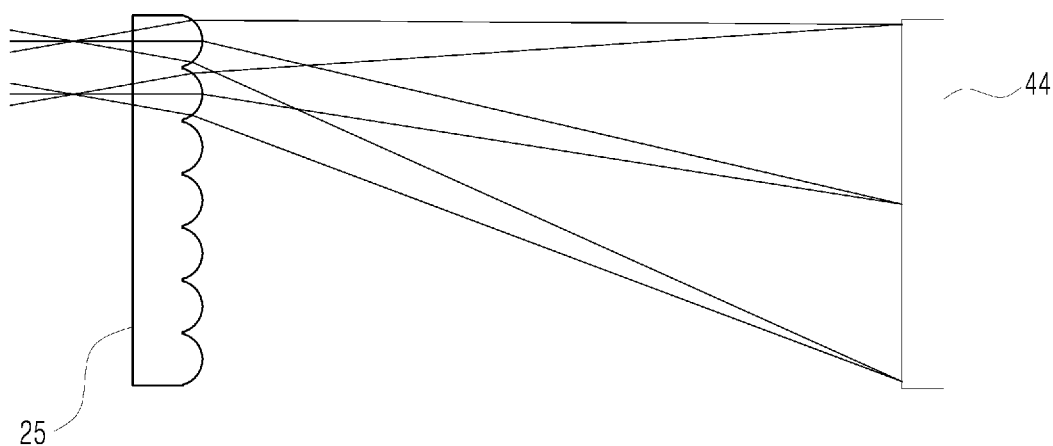
FIGS. 3A to 3C are schematic views of examples in which laser beams form a plurality of patterns through the speckle reduction device according to at least one embodiment of the present disclosure.

FIG. 3A illustrates the pattern of laser beams that are emitted from at least one of the R laser light source a, the G laser light source b, and the B laser light source c and transmitted to the panel 44 via the beam-shaping lens 25 when the beam-shaping lens 25 is fixed.

When the beam-shaping lens 25 is fixed according to a technology without the speckle reduction device of the present disclosure, speckles severely occur due to the coherence of the laser beams.

Figure 3B:
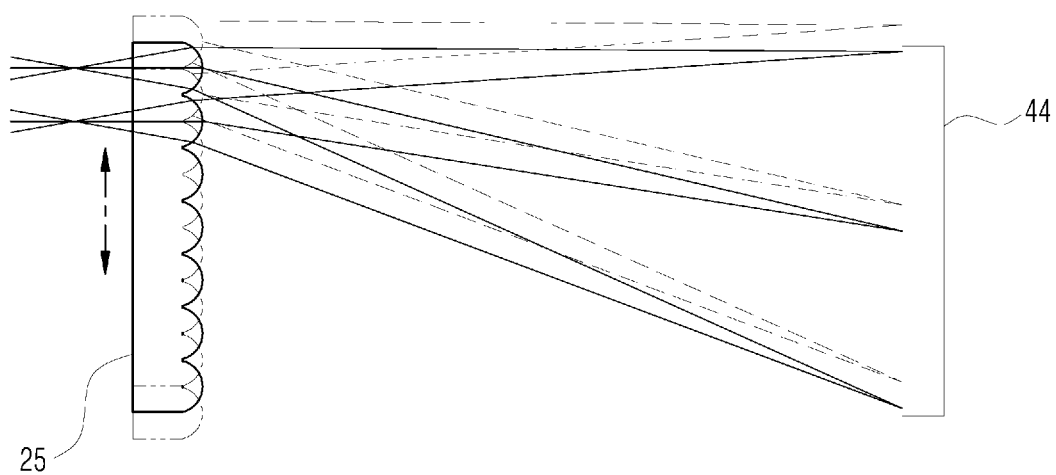
Figure 3C:
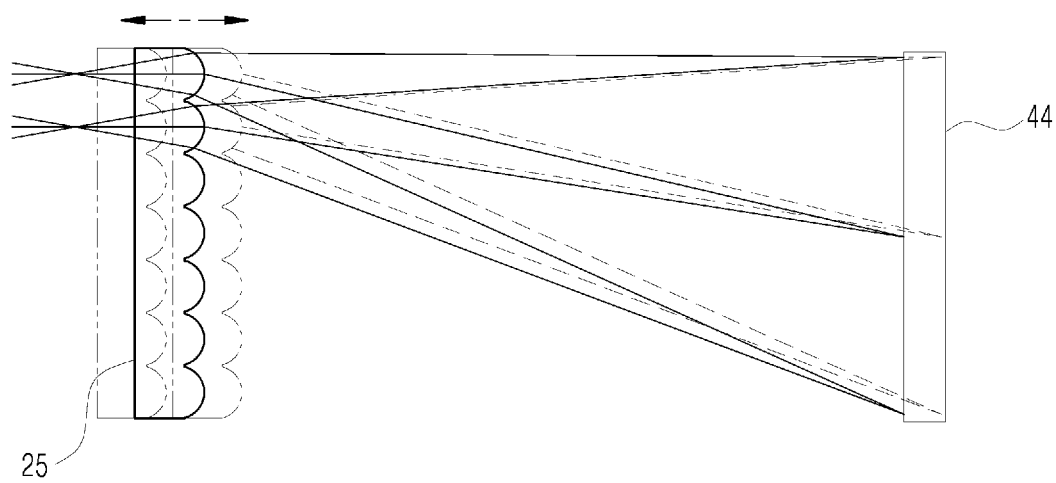

FIGS. 3B and 3C separately illustrate the case in which the beam-shaping lens 25 is vibrated in the direction of the first vibration axis (e.g., the Y-axis) and the case in which the beam-shaping lens 25 is vibrated in the direction of the second vibration axis (e.g., the Z-axis), respectively.

FIG. 3B illustrates the pattern of laser beams emitted from at least one of the R laser light source a, the G laser light source b, and the B laser light source c and transmitted to the panel 44 via the beam-shaping lens 25 when the beam-shaping lens 25 is vibrated in the direction of the first vibration axis (e.g., the Y-axis).

As can be seen from FIG. 3B, the position where the pattern is formed by the laser beams transmitted to the panel 44 when the beam-shaping lens 25 is vibrated in the direction of the first vibration axis (e.g., the Y-axis) is different from the position where the pattern is formed by the laser beams transmitted to the panel 44 when the beam-shaping lens 25 is fixed, as illustrated in FIG. 3A. In FIG. 3B, the broken line indicates the pattern of the laser beams which is transmitted to the panel 44 when the beam-shaping lens is fixed, and the solid line indicates the pattern of laser beams which is transmitted to the panel 44 when the beam-shaping lens 25 is vibrated in the direction of the first vibration axis (e.g., the Y-axis).

That is, since the beam-shaping lens 25 is vibrated in the direction of the first vibration axis (e.g., the Y-axis), the positions on the panel 44 to which the laser beams are correspondingly transmitted move up and down in the direction of the first vibration axis (e.g., the Y-axis) so that the position on the panel 44 to which the laser beams are transmitted varies.

Meanwhile, FIG. 3C illustrates the pattern of laser beams emitted from at least one of the R laser light source a, the G laser light source b, and the B laser light source c and transmitted to the panel 44 via the beam-shaping lens 25 when the beam-shaping lens 25 is vibrated in the second vibration axis (e.g., the Z-axis). In FIG. 3c, the broken line indicates the pattern of the laser beams which is transmitted to the panel 44 when the beam-shaping lens is fixed, and the solid line indicates the pattern of laser beams which is transmitted to the panel 44 when the beam-shaping lens 25 is vibrated in the direction of the second vibration axis (e.g., the Z-axis).

As can be seen from FIG. 3C, the size of the pattern of the laser beams transmitted to the panel 44 when the beam-shaping lens 25 is vibrated in the direction of the second vibration axis (e.g., the Z-axis) is different from the size of the pattern of the laser beams transmitted to the panel 44 when the beam-shaping lens 25 is fixed, as illustrated in FIG. 3A.

That is, since the beam-shaping lens 25 is vibrated in the direction of the second vibration axis (e.g., the Z-axis), the position on the panel 44 to which the laser beams are correspondingly transmitted moves back and forth along the second vibration axis (e.g., the Z-axis) so that the pattern (size) formed by the laser beams transmitted to the panel 44 varies.

FIGS. 3B and 3C separately illustrate the case in which the beam-shaping lens 25 is vibrated in the direction of the first vibration axis (e.g., the Y-axis) (FIG. 3B) and the case in which the beam-shaping lens 25 is vibrated in the direction of the second vibration axis (e.g., the Z-axis) (FIG. 3C).

However, since the vibration unit 27 of the present disclosure is capable of vibrating the beam-shaping lens 25 in the directions of two or more vibration axes, i.e., the first vibration axis (e.g., the Y-axis) and the second vibration axis (e.g., the Z-axis), the laser beams transmitted to the panel 44 form a plurality of patterns, which are more diversified and independent from each other without being limited to the examples illustrated in FIGS. 3A to 3C.

In FIGS. 3A to 3C, the field lens 22, which are composed of a single lens or a plurality of lenses and are positioned next to the beam-shaping lens 25 illustrated in FIG. 1, is not illustrated for the convenience of explanation. However, a practical optical system includes such a field lens 22, and even if the field lens 22 is included, there will be no difference in the speckle reduction principle or effect of the present disclosure.

Particularly, in the present disclosure, when the vibration unit 27 vibrates at a high speed (for example, a frequency of 60 Hz or more) so that the patterns formed by the laser beams transmitted to the panel 44 are varied, the speckles change at such a rapid speed in an image expressed on the screen via the panel unit 40 and the projection optical system 50 that a human cannot visually recognize the change, rather than being fixedly generated, and as a result, the speckles are reduced.

Meanwhile, in the above-described embodiment of the present disclosure, two or more vibration axes have been referred to as the first vibration axis (e.g., the Y-axis) and the second vibration axis (e.g., the Z-axis), but this is merely an example. Of course, vibrate the beam-shaping lens 25 is simultaneously vibrated in the directions of three or more vibration axes in the present disclosure.

At this time, when the number of vibration axes, in the positions of which the beam-shaping lens 25 is vibrated, is increased so as to diversify the patterns of the laser beams transmitted to the panel 44, the efficiency of reducing the speckles is improved.

The present disclosure reduces speckles using an optical element included in the projection optical system, that is, the beam-shaping lens 25, merely by adopting a vibration unit 27 that vibrates the beam-shaping lens 25 in the directions of two or more vibration axes, as described above.

Consequently, optical efficiency is not reduced since no separate optical device for reducing the speckles is added, apart from adopting the vibration unit 27.

As described above, according to the speckle reduction device of the present disclosure, an exemplary embodiment of the present disclosure obtains advantageous effects to efficiently reduce the speckles, which occur due to the coherence of the laser beams, as much as possible using an optical element included in the projection optical system, that is, the beam-shaping lens 25, without additionally using a separate optical device, and to obtain the effect of maximizing the improvement of display quality without deteriorating optical efficiency.

Meanwhile, the speckle reduction device of the present disclosure further performs a control function for controlling the vibration operation of the vibration unit 27.

Hereinafter, a control function for controlling the vibration operation of the vibration unit 27 is described in detail with reference to FIG. 4, in which the speckle reduction device of the present disclosure is illustrated from the viewpoint of control.

Figure 4:
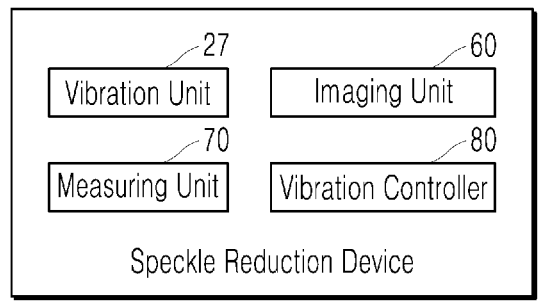
FIG. 4 is a schematic diagram of the speckle reduction device according to at least one embodiment of the present disclosure.

As illustrated in FIG. 4, the speckle reduction apparatus according to an embodiment of the present disclosure includes an imaging unit 60 (not illustrated) configured to image a screen (not illustrated) on which an image generated by the panel 44 is expressed based on transmitted laser beams, a measuring unit 70 configured to analyze an image obtained by the imaging unit and to measure a speckle level (speckle contrast ratio), and a vibration controller 80 configured to control the vibration operation of the vibration unit 27 depending on the speckle level. Other components of the speckle reduction apparatus, such as the vibration unit 27, the imaging unit 60, and the measuring unit 70 are implemented by one or more processors and/or application-specific integrated circuits (ASICs) specified for respectively corresponding operations and functions described herein in the present disclosure. The vibration unit 27 comprises one or more vibration (or piezo) elements (not shown) (e.g., a motor or a vibrator) to vibrate the vibration unit 27 itself and/or the beam-shaping lens 25 in the directions of one or more predetermined vibration axes. Alternatively, the speckle reduction apparatus further comprises one or more stand-alone vibration (or piezo) elements (not shown) to vibrate the vibration unit 27 itself and/or the beam-shaping lens 25 in the directions of one or more predetermined vibration axes. The vibration controller 80 controls the vibration operation of the vibration unit 27 depending on the speckle level such that the vibration (or piezo) elements are operated to adjust, for example, a vibration speed of the vibration unit 27 and/or the beam-shaping lens 25, or a vibration amplitude of the vibration unit 27 and/or the beam-shaping lens 25.

When laser beams transmitted from the illumination optical system 30 is transmitted to the panel 44 after the direction of the direction of being changed by the polarization beam splitter 42, the panel 44 generates an image based on the transmitted laser beams.

The image generated by the panel 44 in this way is projected on the screen by the projection optical system 50, so that the image is displayed on the screen to be capable of being visually recognized.

The imaging unit 60 captures an image projected on the screen.

The measuring unit 70 analyzes the captured image and measures the speckle level presented in the captured image.

For example, the measuring unit 70 measures a numerical speckle value in the image based on a predefined speckle determination standard (i.e., predefined or default reference value of a speckle level) by analyzing the captured image.

Then, when the numerical speckle value is smaller than a first threshold value, the measuring unit 70 determines the speckle level to be "low," when the numerical speckle value is equal to or larger than the first threshold value and smaller than a second threshold value (for convenience of description, it is herein assumed that the first threshold value<the second threshold value), the measuring unit 70 determines the speckle level to be "intermediate," and when the numerical speckle value is equal to the second threshold value or more, the measuring unit 70 determines the speckle level to be "high."

Besides the method of determining the speckle level to be "low," "intermediate," and "high," the speckle level is additionally determined in various ways.

The vibration controller 80 controls the vibration operation of the vibration unit 27 depending on the speckle level.

For example, the vibration controller 80 differently controls the number of vibration axes in the directions of which the vibration unit 27 vibrates, among the vibration axes of the vibration unit 27, the vibration speed of the vibration unit, or the vibration amplitude of the vibration unit, depending on the speckle level which is measured by the measuring unit 70 with respect to the captured image.

According to one exemplary embodiment, the vibration controller 80 increases the number of vibration axes when the speckle level becomes higher, and reduces the number of vibration axes when the speckle level becomes lower.

For example, when it is determined that the speckle level is "low," the vibration controller 80 controls the vibration unit 27 in such a manner that the number of vibration axes, in the directions of which the vibration unit 27 vibrates, among the vibration axes of the vibration unit 27, to be two. When it is determined that the speckle level is "intermediate," the vibration controller 80 controls the vibration unit 27 in such a manner that the number of vibration axes in the directions of which the vibration unit 27 vibrates, among the vibration axes of the vibration unit 27, to be three. And when it is determined that the speckle level is "high," the vibration controller 80 controls the number of vibration axes in the directions of which the vibration unit 27 vibrates, among the vibration axes of the vibration unit 27, to be four.

According to another exemplary embodiment, the vibration controller 80 increases the vibration speed of vibration axes when the speckle level becomes higher, and reduces the vibration speed of vibration axes when the speckle level becomes lower. That is, depending on the speckle level measured by the measuring unit 70 with respect to the captured image, the vibration controller 80 adjusts (e.g., increases or decreases) the vibration speed of vibration axes.

For example, when it is determined that the speckle level is "low," the vibration controller 80 controls the vibration speed of the vibration unit 27 to be a frequency of 40 Hz, which is relatively low, when it is determined that the speckle level is "intermediate," the vibration controller 80 controls the vibration speed of the vibration unit 27 to be a frequency of 50 Hz. And when it is determined that the speckle level is "high," the vibration controller 80 controls the vibration speed of the vibration unit 27 to be a frequency of 60 Hz.

According to another embodiment, the vibration controller 80 increases the vibration amplitude when the speckle level becomes higher, and reduces the vibration amplitude when the speckle level becomes lower. That is, depending on the speckle level measured by the measuring unit 70 with respect to the captured image, the vibration controller 80 adjusts (e.g., increases or decreases) the vibration amplitude of the vibration (or piezo) elements which are configured in the vibration unit 27.

For example, when it is determined that the speckle level is "low," the vibration controller 80 controls the vibration amplitude of the vibration unit 27 to be half or less the size of an individual Fly Eye Lens (FEL). When it is determined that the speckle level is "intermediate," the vibration controller 80 controls the vibration amplitude of the vibration unit 27 to be equal to the size of the individual FEL. And when it is determined that the speckle level is "high," the vibration controller 80 controls the vibration amplitude of the vibration unit 27 to be larger than the size of the individual FEL.

When the vibration operation of the vibration unit 27 is controlled depending on the speckle level as described above, the various embodiments of the present disclosure are able to obtain advantageous effects to prevent in advance small concerns that is caused by unnecessarily vibrating the beam-shaping lens 25 (e.g., power consumption, lifespans of the beam-shaping lens 25 and the vibration unit 27, and fine vibration noise), without compromising the purpose of reducing speckles.

According to various embodiments of the present disclosure, speckles are reduced using an optical element of a projection optical system without additionally using a separate optical device.

Meanwhile, the steps of methods, algorithms, or control functions described in connection with the embodiments provided herein are implemented directly by hardware including one or more processors and/or application-specific integrated circuits (ASICs) specified for respectively corresponding operations and functions described above, or are implemented in the form of program instructions implemented by the one or more processors, which can be executed through various computer means, and recorded in a non-transitory computer readable recording medium. Although all of the components of the embodiments of the present disclosure have been explained as assembled or operatively connected as a unit, the present disclosure is not intended to limit itself to such embodiments. Rather, within the objective scope of the claimed invention, the respective components are able to be selectively and operatively combined in any numbers. Every one of the components are also implemented by itself in hardware while the respective ones can be combined in part or as a whole selectively and implemented in a computer program having program modules for executing functions of the hardware equivalents. Codes or code segments to constitute such a program is easily deduced by a person skilled in the art. The computer program may be stored in non-transitory computer readable recording medium, which in operation can realize some embodiments of the present disclosure. The non-transitory computer readable medium indicates, for example, a program command, a data file, a data structure, and the like independently or in combination. The program command recorded in the medium is things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device is configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the spirit and the scope of the claimed invention. Specific terms used in this disclosure and drawings are used for illustrative purposes and not to be considered as limitations of the present disclosure. Therefore, exemplary embodiments of the present disclosure have not been described for limiting purposes. Accordingly, the scope of the claimed invention is not to be limited by the above embodiments but by the claims and the equivalents thereof.

What is claimed is:

1. A speckle reduction device comprising:
   a beam-shaping lens configured to
      shape at least one laser beam emitted from at least one light source, and
      transmit the shaped laser beam to a panel; and
   a vibration unit configured to vibrate the beam-shaping lens in directions of two or more vibration axes such that a direction of the laser beam to be transmitted to the panel is changed to form a plurality of different patterns,
   wherein the two or more vibration axes include a first vibration axis defined in a plane of the beam-shaping lens and a second vibration axis that is orthogonal to the first vibration axis, and
   wherein,
      when the beam-shaping lens is vibrated in a direction of the first vibration axis, the laser beam transmitted to the panel forms a pattern at a position which is different from a position at which the laser beam forms a pattern when the beam-shaping lens is fixed, and when the beam-shaping lens is vibrated in a direction of the second vibration axis, the laser beam transmitted to the panel forms a pattern having a size that is different from a size of the pattern that is formed by the laser beam when the beam-shaping lens is fixed.

2. The speckle reduction device of claim 1, wherein the vibration unit is implemented by a single vibration element having two or more vibration axes, or by two or more vibration elements, each of which has a single vibration axis.

3. The speckle reduction device of claim 1, further comprising:
an imaging unit configured to capture an image of a screen on which the image generated by the panel is displayed based on the laser beam transmitted to the panel;
a measuring unit configured to analyze the image obtained by the imaging unit so as to measure a speckle level of the image; and
a vibration controller configured to control a vibration operation of the vibration unit to adjust the speckle level.

4. The speckle reduction device of claim 3, wherein
the vibration controller determines the speckle level based on a predefined threshold value, and
the vibration controller controls the vibration unit in such a manner that a number of vibration axes, in directions of which the vibration unit is vibrated, among the vibration axes of the vibration unit, a vibration speed of the vibration unit, or a vibration amplitude of the vibration unit varies, depending on the speckle level.

5. The speckle reduction device of claim 4, wherein when the speckle level is determined to be higher than the predefined threshold value, the vibration controller controls the vibration unit to increase the number of vibration axes, and
when the speckle level is determined to be lower than the predefined threshold value, the vibration controller controls the vibration unit to decrease the number of vibration axes.

6. The speckle reduction device of claim 4, wherein when the speckle level is determined to be higher than the predefined threshold value, the vibration controller controls the vibration unit to increase a vibration speed of the vibration unit, and
when the speckle level is determined to be lower than the predefined threshold value, the vibration controller controls the vibration unit to decrease the vibration speed of the vibration unit.

7. The speckle reduction device of claim 4, wherein when the speckle level is determined to be higher than the predefined threshold value, the vibration controller controls the vibration unit to increase a vibration amplitude of the vibration unit, and
when the speckle level is determined to be lower than the predefined threshold value, the vibration controller controls the vibration unit to decrease the vibration amplitude of the vibration unit.

8. A method of reducing a speckle level, comprising:
shaping at least one laser beam emitted from at least one light source;
transmitting the shaped laser beam to a panel;
vibrating beam-shaping lens in directions of two or more vibration axes to change a direction of the laser beam to be transmitted to the panel to thereby form a plurality of different patterns;
capturing an image of a screen on which the image generated by the panel is displayed based on the laser beam transmitted to the panel;
analyzing the image obtained by the imaging unit so as to measure a speckle level of the image; and
controlling a vibration operation of a vibration unit to reduce the speckle level,
wherein the two or more vibration axes include a first vibration axis defined in a plane of the beam-shaping lens and a second vibration axis that is orthogonal to the first vibration axis, and
wherein,
when the beam-shaping lens is vibrated in a direction of the first vibration axis, the laser beam transmitted to the panel forms a pattern at a position which is different from a position at which the laser beam forms a pattern when the beam-shaping lens is fixed, and
when the beam-shaping lens is vibrated in a direction of the second vibration axis, the laser beam transmitted to the panel forms a pattern having a size that is different from a size of the pattern that is formed by the laser beam when the beam-shaping lens is fixed.

9. The method of claim 8, further comprising:
determining the speckle level based on a predefined threshold value.

10. The method of claim 8, whether
the vibration operation of the vibration unit is controlled by adjusting
a number of vibration axes, in directions of which the vibration unit is vibrated, among the vibration axes of the vibration unit,
a vibration speed of the vibration unit, or
a vibration amplitude of the vibration unit varies, depending on the speckle level.

11. The method of claim 9, wherein
controlling the vibration unit to increase the number of vibration axes, when the speckle level is determined to be higher than the predefined threshold value, and
controlling the vibration unit to decrease the number of vibration axes, when the speckle level is determined to be lower than the predefined threshold value.

12. The method of claim 9, wherein
controlling the vibration unit to increase a vibration speed of the vibration unit, when the speckle level is determined to be higher than the predefined threshold value, and
controlling the vibration unit to decrease the vibration speed of the vibration unit when the speckle level is determined to be lower than the predefined threshold value.

13. The method of claim 9, wherein
controlling the vibration unit to increase a vibration amplitude of the vibration unit, when the speckle level is determined to be higher than the predefined threshold value, and
controlling the vibration unit to decrease the vibration amplitude of the vibration unit, when the speckle level is determined to be lower than the predefined threshold value.

* * * * *